(12) United States Patent
Wang et al.

(10) Patent No.: US 9,963,248 B2
(45) Date of Patent: May 8, 2018

(54) SPIN STABILIZATION OF A SPACECRAFT FOR AN ORBIT MANEUVER

(71) Applicant: The Boeing Company, Chicago, IL (US)

(72) Inventors: Qinghong W. Wang, Torrance, CA (US); Alexander Jacob Sobel, Los Angeles, CA (US); Gary Lemke, Torrance, CA (US); Timothy Lui, San Pedro, CA (US); Kangsik Lee, Torrance, CA (US); Glenn N. Caplin, Manhattan Beach, CA (US); Troy Allen Fontana, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/016,204

(22) Filed: Feb. 4, 2016

(65) Prior Publication Data
US 2017/0225805 A1   Aug. 10, 2017

(51) Int. Cl.
*B64G 1/24*   (2006.01)
*B64G 1/28*   (2006.01)
(Continued)

(52) U.S. Cl.
CPC .......... *B64G 1/24* (2013.01); *B64G 1/26* (2013.01); *B64G 1/281* (2013.01); *B64G 1/283* (2013.01);
(Continued)

(58) Field of Classification Search
CPC ................................ B64G 1/24; B64G 1/26
See application file for complete search history.

(56) References Cited

U.S. PATENT DOCUMENTS 5,667,171 A * 9/1997 Fowell ............... B64G 1/24
                                                244/164
5,934,620 A * 8/1999 Abernethy ............. B64G 1/24
                                                244/168
(Continued)

FOREIGN PATENT DOCUMENTS

| EP | 0568209 A1 | 11/1993 | |
| EP | 0937644 A2 * | 8/1999 | ............... B64G 1/26 |
| EP | 1428755 A1 | 6/2004 | |

OTHER PUBLICATIONS

European Search Report; Application EP17154279; dated Jun. 30, 2017.

*Primary Examiner* — Jess Whittington
(74) *Attorney, Agent, or Firm* — Duft Bornsen & Fettig LLP

(57) ABSTRACT

Apparatus and methods for controlling a spacecraft for a transfer orbit. The spacecraft includes a momentum subsystem that stores angular momentum relative to a center of mass of the spacecraft, and a propulsion subsystem that includes electric thrusters. A controller identifies a target spin axis for the spacecraft, determines gimbal angles for electric thruster(s) that so that thrust forces from the electric thrusters are parallel to the target spin axis, and initiates a burn of the electric thruster(s) at the gimbal angles. The controller controls the momentum subsystem to compensate for a thruster torque produced by the burn of the electric thrusters. The momentum subsystem is able to produce a target angular momentum about the center of mass, where a coupling between the target angular momentum and an angular velocity of the spacecraft creates an offset torque to counteract the thruster torque.

20 Claims, 9 Drawing Sheets

(51) Int. Cl.
  *B64G 1/26* (2006.01)
  *B64G 1/36* (2006.01)
  *B64G 1/40* (2006.01)

(52) U.S. Cl.
  CPC ............... *B64G 1/286* (2013.01); *B64G 1/36* (2013.01); *B64G 1/405* (2013.01); *B64G 2001/245* (2013.01)

(56) References Cited

U.S. PATENT DOCUMENTS

| | | | | |
|---|---|---|---|---|
| 5,984,236 A * | 11/1999 | Keitel | ................ | B64G 1/24 244/164 |
| 6,032,903 A * | 3/2000 | Fowell | ................ | B64G 1/24 244/164 |
| 6,032,904 A * | 3/2000 | Hosick | ................ | B64G 1/26 244/169 |
| 6,053,455 A * | 4/2000 | Price | ................ | B64G 1/26 244/169 |
| 6,062,512 A | 5/2000 | Wang et al. | | |
| 6,076,773 A * | 6/2000 | Salvatore | ............ | B64G 1/1007 244/164 |
| 6,102,337 A * | 8/2000 | Quartararo | ............ | B64G 1/26 244/169 |
| 6,435,457 B1 * | 8/2002 | Anzel | ................ | B64G 1/26 244/169 |
| 6,481,672 B1 | 11/2002 | Goodzeit et al. | | |
| 6,565,043 B1 * | 5/2003 | Wittmann | ............ | B64G 1/242 244/169 |
| 6,860,451 B1 * | 3/2005 | Wang | ................ | B64G 1/24 244/164 |
| 7,464,898 B1 * | 12/2008 | Goodzeit | ............ | B64G 1/26 244/164 |
| 8,620,496 B2 | 12/2013 | Liu et al. | | |
| 2006/0049315 A1 * | 3/2006 | Patel | ................ | B64G 1/26 244/169 |
| 2011/0024571 A1 * | 2/2011 | Tsao | ................ | B64G 1/24 244/171 |
| 2015/0001345 A1 * | 1/2015 | Polle | ................ | B64G 1/26 244/158.6 |
| 2016/0194095 A1 * | 7/2016 | Weiss | ................ | B64G 1/26 701/13 |

* cited by examiner

SPIN STABILIZATION OF A SPACECRAFT FOR AN ORBIT MANEUVER

FIELD

This disclosure relates to the field of spacecraft, and more particularly, to transfer orbits of a spacecraft.

BACKGROUND

Satellites or other spacecraft are configured to orbit around the Earth for a variety of purposes, such as communications, exploration, etc. For example, a geosynchronous satellite orbits the Earth and follows the direction of the Earth's rotation. Geosynchronous satellites orbit at a radius of about 42,164 kilometers from the center of the Earth. One revolution of a geosynchronous satellite around the Earth takes about 24 hours, which is the same amount of time it takes for the Earth to rotate once about its axis. These types of satellites are considered geosynchronous because they appear stationary when viewed from a particular location on the Earth, and are commonly used as communication satellites.

To put a geosynchronous satellite into a geosynchronous orbit, the satellite is loaded into a payload of a launch vehicle, and the launch vehicle carries the satellite into space. The launch vehicle may not carry the satellite all the way to the geosynchronous orbit (e.g., 42,164 kilometers), but instead releases the satellite at a lower orbit. The lower orbit may be a few hundred kilometers from Earth. The satellite then performs maneuvers with onboard thrusters to enter a transfer orbit that takes the satellite to the geosynchronous altitude.

Three-axis attitude control may be performed in the transfer orbit. For example, solar power may support the maneuvers of the satellite after separation from the launch vehicle, so the solar panels on the satellite are deployed after separation. High disturbance torques on the satellite makes it difficult to maintain attitude control when passing through low perigees. Therefore, it is desirable to identify new and improved ways for raising a satellite to a higher orbit, before reaching a geosynchronous orbit.

SUMMARY

Spinning a spacecraft (e.g., a satellite) in a transfer orbit mitigates issues of attitude control by providing gyroscopic rigidity. The systems and methods described herein stabilize the spinning spacecraft in the transfer orbit, and increase efficiency of thrusters used in the orbital maneuvers. In a powered ascent, low-thrust electric thrusters produce a velocity change ($\Delta V$) in the spacecraft to raise the orbit of the spacecraft. The momentum vector of the spinning spacecraft is parallel to the desired $\Delta V$ direction. This attitude of the spacecraft momentum is achieved either at separation from the launch vehicle or through reorientation maneuvers using thrusters. Furthermore, the momentum vector attitude may be maintained or adjusted by the thrusters during orbit maneuvers. A spin controller stabilizes the spacecraft to spin about a target axis in the spacecraft frame. At steady-state, the spin axis aligns with the spacecraft momentum vector.

The electric thrusters are gimbaled, and thrust forces are pointed parallel to the spin axis instead of through the center of mass of the spacecraft. Because the electric thrusters are pointed along the spin axis, the cosine loss for the electric thrusters is minimized for the maneuvers and the electric thrusters are used efficiently. However, when the thrusters are pointed along the spin axis, firing of the thrusters results in a body fixed torque acting on the spacecraft. To compensate for the torque created by firing one or more thrusters, a subsystem (e.g., a reaction wheel subsystem, a control momentum gyroscope (CMG), etc.) produces an angular momentum that couples with the angular velocity of the satellite to create an offsetting torque that cancels the torque from the thruster(s). Therefore, the spin axis of the spacecraft maintains fixed in the inertial frame and parallel to the desired direction of $\Delta V$.

One embodiment comprises a spacecraft comprising a bus having a nadir side and a zenith side opposite the nadir side. The spacecraft further includes a momentum subsystem configured to store angular momentum relative to a center of mass of the spacecraft, and a propulsion subsystem that includes a plurality of electric thrusters installed on the zenith side of the bus to produce a change in velocity (delta-V) on the spacecraft. Each of the electric thrusters is coupled to the bus by a two-axis gimbal assembly. The spacecraft further includes a controller configured to identify a target spin axis for the spacecraft, to determine gimbal angles for at least one of the electric thrusters that so that thrust forces from the at least one electric thruster are parallel to the target spin axis, and to initiate a burn of the at least one electric thruster at the gimbal angles. The controller is configured to control the momentum subsystem to compensate for a thruster torque produced by the burn of the at least one electric thruster at the gimbal angles.

In another embodiment, the momentum subsystem is configured to produce a target angular momentum, where a coupling between the target angular momentum and an angular velocity of the spacecraft creates an offset torque to counteract the thruster torque created from the burn of the at least one electric thruster.

In another embodiment, the controller is configured to estimate an angular velocity of the spacecraft, to estimate the thruster torque created from the burn of the at least one electric thruster, to determine the target angular momentum based on the angular velocity and the thruster torque, and to generate a command to instruct the momentum subsystem to produce the target angular momentum.

In another embodiment, the target spin axis is aligned with a target delta-V direction.

In another embodiment, the momentum subsystem comprises a reaction wheel subsystem having a plurality of reaction wheels.

In another embodiment, the momentum subsystem comprises a control momentum gyroscope (CMG).

In another embodiment, a sensor subsystem that includes an attitude sensor configured to provide measurement data of an attitude of the spacecraft.

In another embodiment, a sensor subsystem that includes a rate sensor configured to provide measurement data of an angular velocity of the spacecraft.

In another embodiment, the plurality of electric thrusters includes a northwest thruster, a northeast thruster, a southwest thruster, and a southeast thruster installed on the zenith side of the bus.

In another embodiment, the electric thrusters use xenon as a propellant.

Another embodiment comprises a method for controlling a spacecraft in a transfer orbit, where the spacecraft comprises a bus having a nadir side and a zenith side opposite the nadir side, a momentum subsystem configured to store angular momentum relative to a center of mass of the spacecraft, and a propulsion subsystem that includes a plurality of electric thrusters installed on the zenith side of the bus by a two-axis gimbal assembly. The method includes identifying a target spin axis for the spacecraft in the transfer orbit, determining gimbal angles for at least one of the electric thrusters that so that thrust forces from the at least one electric thruster are parallel to the target spin axis, initiating a burn of the at least one electric thruster at the gimbal angles, and controlling the momentum subsystem to compensate for a thruster torque produced by the burn of the at least one electric thruster at the gimbal angles.

Another embodiment comprises a controller configured to control a spacecraft in a transfer orbit, where the spacecraft comprises a bus having a nadir side and a zenith side opposite the nadir side, a momentum subsystem that stores angular momentum relative to a center of mass of the spacecraft, and a propulsion subsystem that includes a plurality of electric thrusters installed on the zenith side of the bus. Each of the electric thrusters is coupled to the bus by a two-axis gimbal assembly. The controller is configured to identify a target spin axis for the spacecraft, to determine gimbal angles for at least one of the electric thrusters so that thrust forces from the at least one electric thruster are parallel to the target spin axis, to initiate a burn of the at least one electric thruster at the gimbal angles, and to control the momentum subsystem to compensate for a thruster torque produced by the burn of the at least one electric thruster at the gimbal angles.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
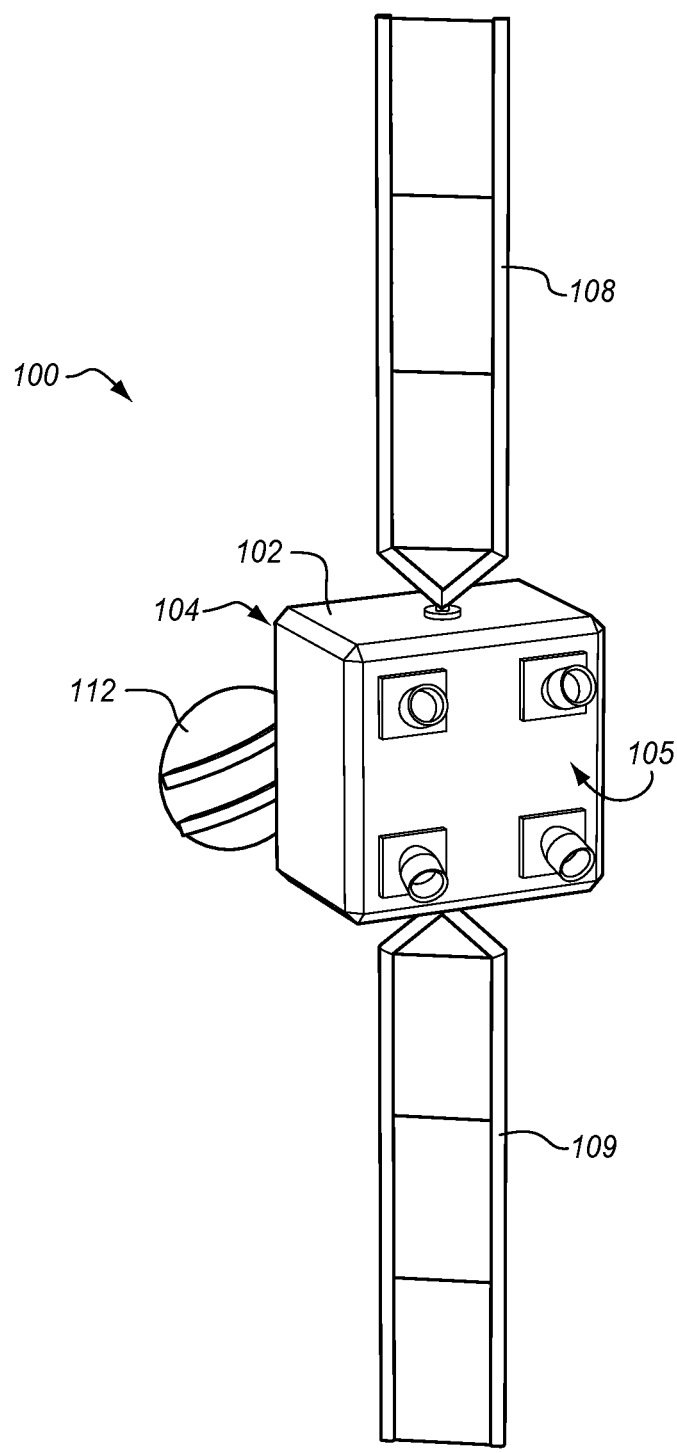
FIG. 1 illustrates a satellite in an exemplary embodiment.

FIG. 1 illustrates a satellite 100 in an exemplary embodiment. Although the term "satellite" is used herein, the embodiments described below apply to any type of spacecraft or space vehicle. Satellite 100 includes a main body frame that carries a payload, which is referred to as a bus 102. When viewed from the Earth or another primary body, bus 102 includes a nadir side 104 (i.e., front side) and an opposing zenith side 105 (i.e., back side or anti-nadir side). The terms "side" or "face" may be used interchangeably when discussing bus 102. Satellite 100 also includes solar panels 108-109 that are attached to bus 102, and may be used to derive electricity from the Sun to power different components on satellite 100. Satellite 100 also includes instruments or subsystems, such as one or more antennas 112 that may be used for communications. The structure of satellite 100 shown in FIG. 1 is an example, and may vary as desired.

Figure 2:
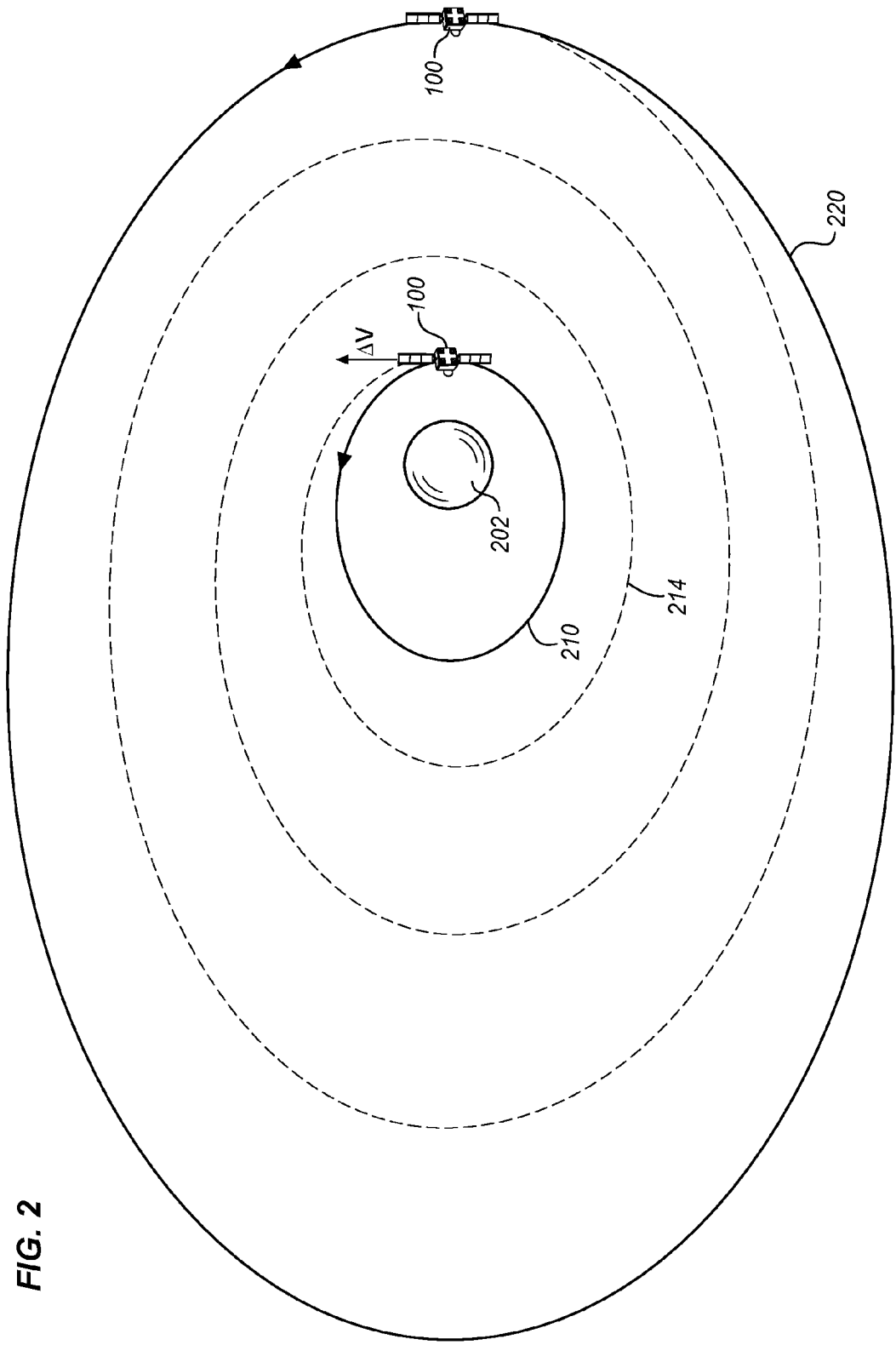
FIG. 2 illustrates raising a satellite from one orbit to another in an exemplary embodiment.

Satellite 100 may comprise a geosynchronous satellite that orbits the Earth and follows the direction of the Earth's rotation. Satellite 100 is initially released into space by a launch vehicle and begins to orbit the Earth at an altitude that is much lower than a geosynchronous altitude. Satellite 100 then performs orbital maneuvers to rise from the initial orbit to the geosynchronous orbit on a "transfer orbit". A transfer orbit is defined herein as a trajectory by which satellite 100 moves from one orbit to another. FIG. 2 illustrates satellite 100 rising from one orbit to another in an exemplary embodiment. When satellite 100 is initially launched from the Earth 202 in a launch vehicle, it separates from the launch vehicle and begins to orbit the Earth 202 at an initial orbit 210. The solar panels 108-109 (see FIG. 1) are deployed from satellite 100 after separation from the launch vehicle to obtain power from the Sun. To raise the height of the orbit to another orbit (e.g., geosynchronous), thruster burns are performed to change the velocity (the change in velocity is referred to as $\Delta V$) of satellite 100. The $\Delta V$ raises the altitude of the orbit for satellite 100. Satellite 100 may take a spiral-like transfer orbit 214 (illustrated as a dotted line) until it reaches a final (e.g., geosynchronous) orbit 220. The transfer orbit 214 illustrated in FIG. 2 is just an example to show how satellite 100 may raise in altitude due to velocity changes.

Some satellites may use chemical thrusters in maneuvers for a transfer orbit. A chemical thruster is a type of thruster that burns liquid propellant to produce thrust. One type of chemical thruster is referred to as a bipropellant (or biprop) thruster that burns a liquid fuel and a liquid oxidizer in a combustion chamber. Satellite 100 uses a propulsion subsystem for maneuvers in a transfer orbit that includes only electric thrusters. An electric thruster is a type of "low-thrust" thruster (e.g., produces thrust that is less than 0.1 Newton) that produces electric thrust by accelerating ions. In a typical electric thruster, a propellant (e.g., xenon) is injected into an ionization chamber and ionized by electron bombardment. The ions are then accelerated by an electromagnetic field, and emitted from the thruster as exhaust that produces thrust. One example of an electric thruster is a Xenon Ion Propulsion System (XIPS©) manufactured by L-3 Communications of Aurora, Colo.

Figure 3:
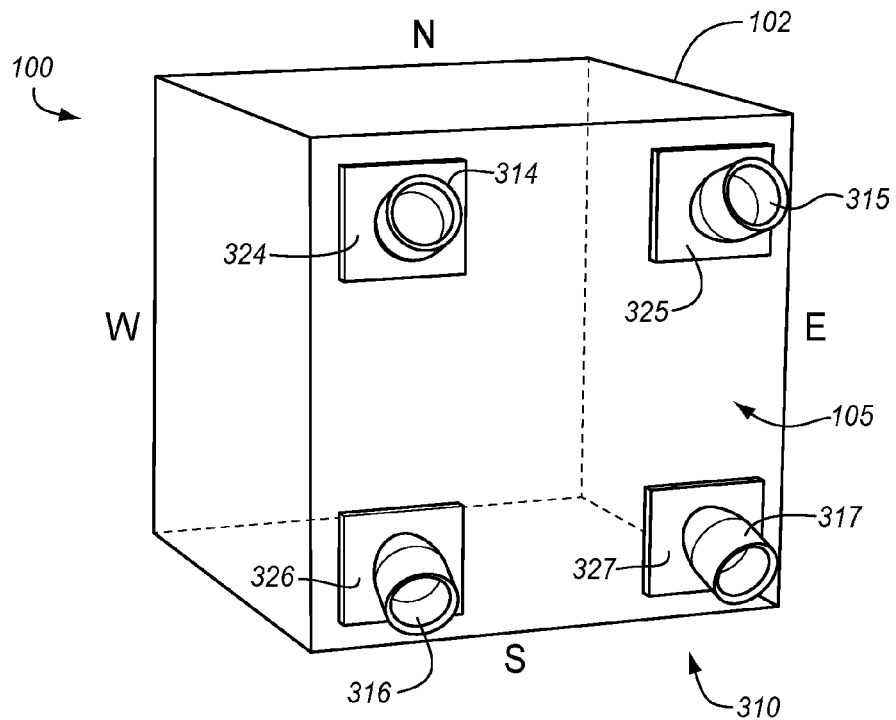
FIG. 3 illustrates a propulsion subsystem for a satellite in an exemplary embodiment.

FIG. 3 illustrates a propulsion subsystem 310 for satellite 100 in an exemplary embodiment. The view in FIG. 3 is of the zenith side 105 of satellite bus 102. The top side of bus 102 is referred to as the north side (indicated by "N"), and the bottom side of bus 102 is referred to as the south side (indicated by "S"). The left side of bus 102 in FIG. 3 is referred to as the west side (indicated by "W"), and the right side of bus 102 in FIG. 3 is referred to as the east side (indicated by "E"). The zenith side 105 of bus 102 includes thrusters 314-317 that are part of propulsion subsystem 310.

Thrusters 314-317 are respectively positioned in northwest, northeast, southwest, and southeast regions of zenith side 105 in this embodiment. Each thruster 314-317 is coupled to bus 102 by a gimbal assembly. For example, northwest thruster 314 is coupled to bus 102 by gimbal assembly 324, northeast thruster 315 is coupled to bus 102 by gimbal assembly 325, southwest thruster 316 is coupled to bus 102 by gimbal assembly 326, and southeast thruster 317 is coupled to bus 102 by gimbal assembly 327. Each gimbal assembly 324-327 is configured to pivot along two axes to alter the thrust vector of its corresponding thruster 314-317. The gimbal angles for each gimbal assembly are referred to herein as $\rho$ and $\gamma$. Although not specifically shown in FIG. 3, gimbal assemblies 324-327 may include gimbals or gimbal units, rotary motors that control movement of the gimbals, and rotary encoders that determine the mechanical position of the gimbals.

The number or positions of thrusters 314-317 as shown in FIG. 3 is for an exemplary configuration, and other thruster configurations may be used in other embodiments. Also, other thrusters may be used on satellite 100 for stationkeeping maneuvers that are not illustrated in FIG. 3.

Figure 4:
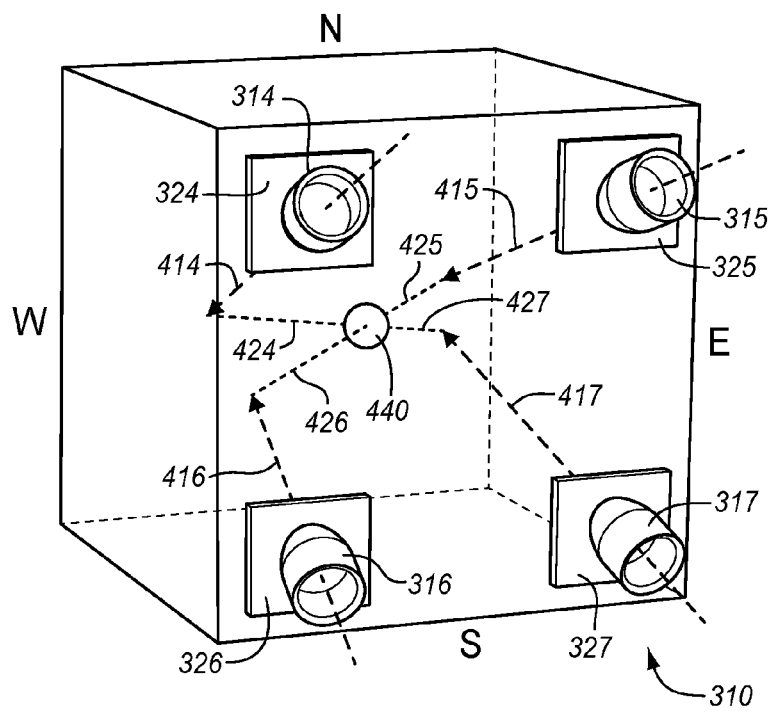
FIG. 4 illustrates thrust lines of thrusters for a propulsion subsystem in an exemplary embodiment.

FIG. 4 illustrates the thrust lines of thrusters 314-317 for propulsion subsystem 310 in an exemplary embodiment. Each thruster 314-317 is capable of producing thrust forces that create a $\Delta V$ in satellite 100. Thrust line 414 represents the direction of a thrust force produced by thruster 314. Thrust line 415 represents the direction of a thrust force produced by thruster 315. Thrust line 416 represents the direction of a thrust force produced by thruster 316. Thrust line 417 represents the direction of a thrust force produced by thruster 317. The thrust lines for each thruster 314-317 may be altered from what is shown in FIG. 4 because thrusters 314-317 are gimbaled. Thrusters 314-317 can be directed so that their thrust lines are spaced by moment arms from the center of mass (COM) 440 of satellite 100. For instance, thrust line 414 is spaced from the center of mass 440 by moment arm 424, thrust line 415 is spaced from the center of mass 440 by moment arm 425, thrust line 416 is spaced from the center of mass 440 by moment arm 426, and thrust line 417 is spaced from the center of mass 440 by moment arm 427. A thruster 314-317 directed to have a moment arm R and generating a force F can induce a torque T in satellite 100 (i.e., $T=R\times F$). Therefore, the attitude or orientation of satellite 100 may be controlled based on the moment arms and the force (or amount of thrust) of thrusters 314-317.

In the embodiment described below, satellite 100 is allowed to spin in at least a portion of the transport orbit (e.g., through low perigees). In some traditional transfer orbits, three-axis attitude control was maintained for the satellite as it moved from one orbit to another. Unfortunately, the satellite is subjected to different forces that make three-axis attitude control difficult when passing through low perigees. In the embodiments described herein, satellite 100 is allowed to spin about a fixed axis of the spacecraft instead of maintaining three-axis attitude control, and is stabilized by active nutation control.

Figure 5:
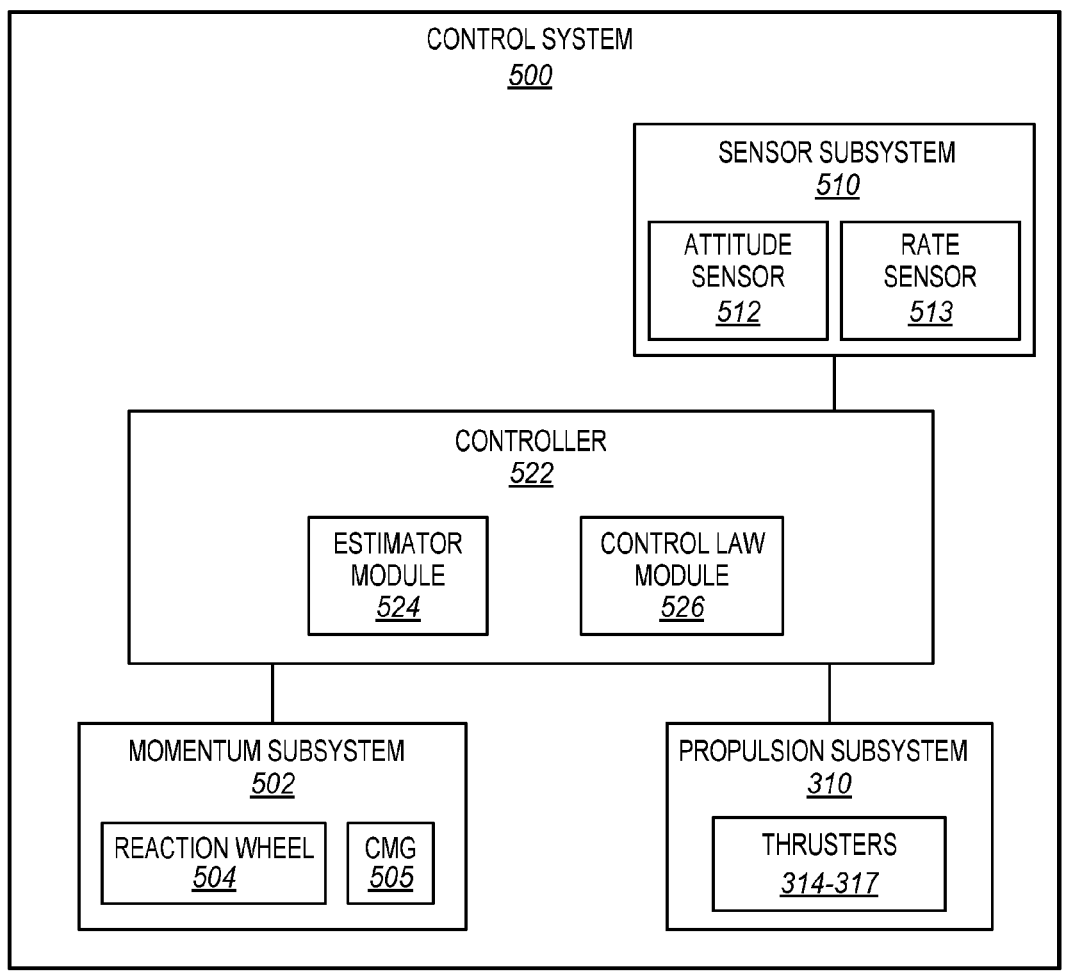
FIG. 5 is a schematic diagram of a control system for orbital maneuvers in an exemplary embodiment.

FIG. 5 is a schematic diagram of a control system 500 for orbital maneuvers in an exemplary embodiment. Control system 500 includes propulsion subsystem 310, a momentum subsystem 502, a sensor subsystem 510, and a controller 522. Propulsion subsystem 310 is a system that uses electric thrusters 314-317 to create a $\Delta V$ in satellite 100 in a transfer orbit. Propulsion subsystem 310 may also be used for attitude control, inclination control, etc., when satellite 100 reaches a desired orbit (e.g., geosynchronous orbit). Momentum subsystem 502 is a system that is able to follow a momentum command or a torque command from the control law module. Momentum subsystem 502 may comprise a reaction wheel subsystem 504, which is a system that uses a plurality of reaction wheels to rotate around a center of mass of a body. Momentum subsystem 502 may alternatively comprise a Control Momentum Gyroscope (CMG) 505, which is a system that uses a spinning rotor and one or more motorized gimbals that tilt the rotor's angular momentum. Sensor subsystem 510 is a system that is able to provide measurement data of the attitude or rate of satellite 100. Sensor subsystem 510 may include one or more attitude sensors 512 that are capable of providing measurement data for determining the orientation of satellite 100, one or more rate sensors 513 that are capable of providing measurement data for determining an angular velocity of satellite 100, etc. Some examples of sensors 512-513 include a gyroscope, a Star tracker, etc.

Controller 522 is coupled to propulsion subsystem 310, momentum subsystem 502, and sensor subsystem 510. Controller 522 comprises devices, components, or modules (including hardware, software, or a combination of hardware and software) that process data from sensor subsystem 510, and computes control signals for propulsion subsystem 310 and momentum subsystem 502. Controller 522 may be located on Earth, and able to communicate with subsystems 310, 502, and 510 via wireless signals. Controller 522 may alternatively be located on satellite 100. Controller 522 may alternatively be modularized with a portion of controller 522 located on Earth, and a portion located locally on satellite 100.

Figure 6:
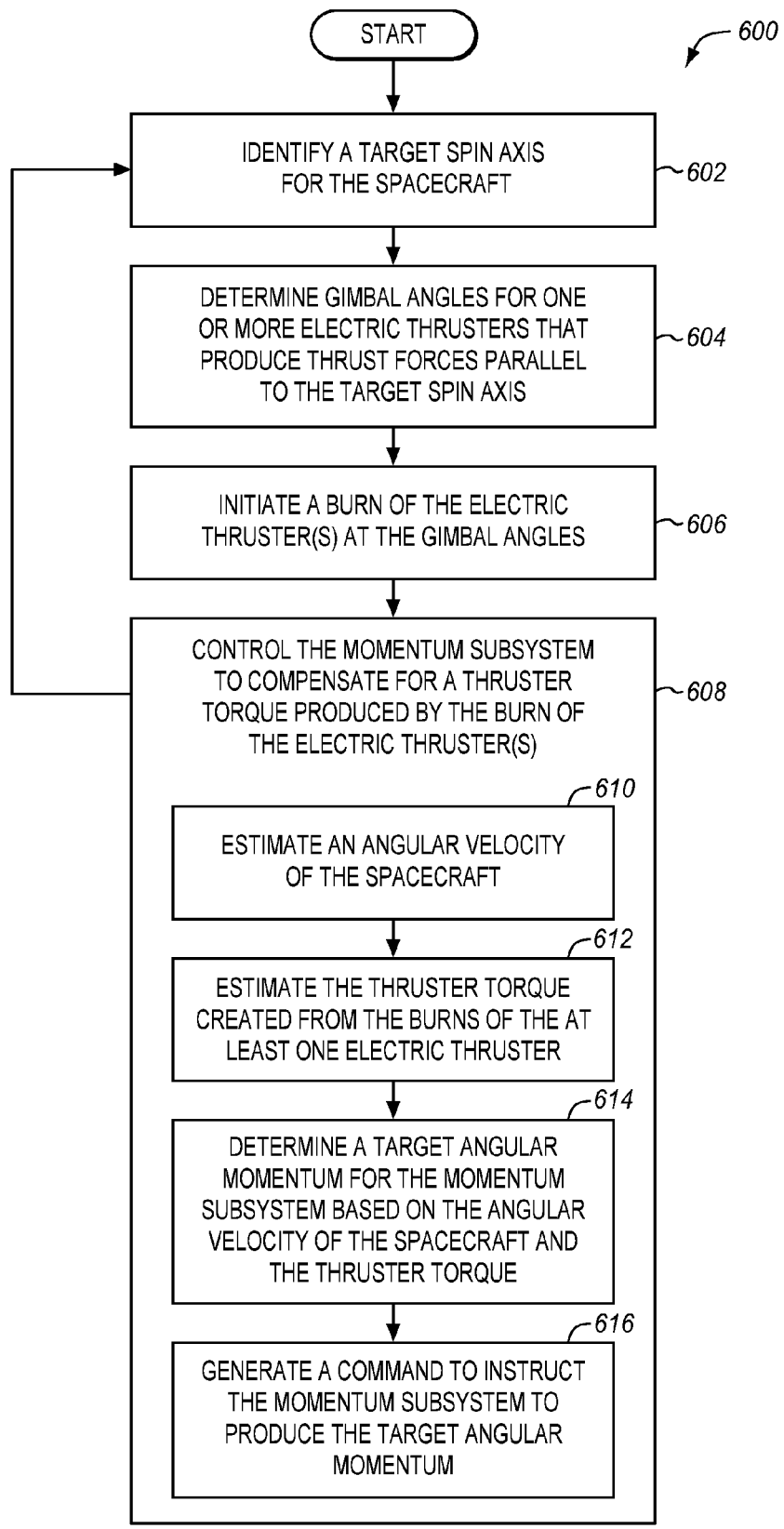
FIG. 6 is a flow chart illustrating a method for spin stabilization of a satellite during an orbit maneuver in an exemplary embodiment.

FIG. 6 is a flow chart illustrating a method 600 for spin stabilization of satellite 100 during an orbit maneuver in an exemplary embodiment. The steps of method 600 will be described with respect to satellite 100, although one skilled in the art will understand that the methods described herein may be performed for other satellites or systems not shown. The steps of the methods described herein are not all inclusive and may include other steps not shown. The steps for the flow charts shown herein may also be performed in an alternative order.

It is assumed that satellite 100 has been transported into space with a launch vehicle, has separated from the launch vehicle, and solar panels 108-109 have been deployed (see FIG. 1). Satellite 100 will begin to move in its initial orbit when separating from the launch vehicle (see FIG. 2). Control system 500 will then control maneuvers of satellite 100 in a transfer orbit that raises satellite 100 from the initial orbit to a final orbit.

Figure 7:
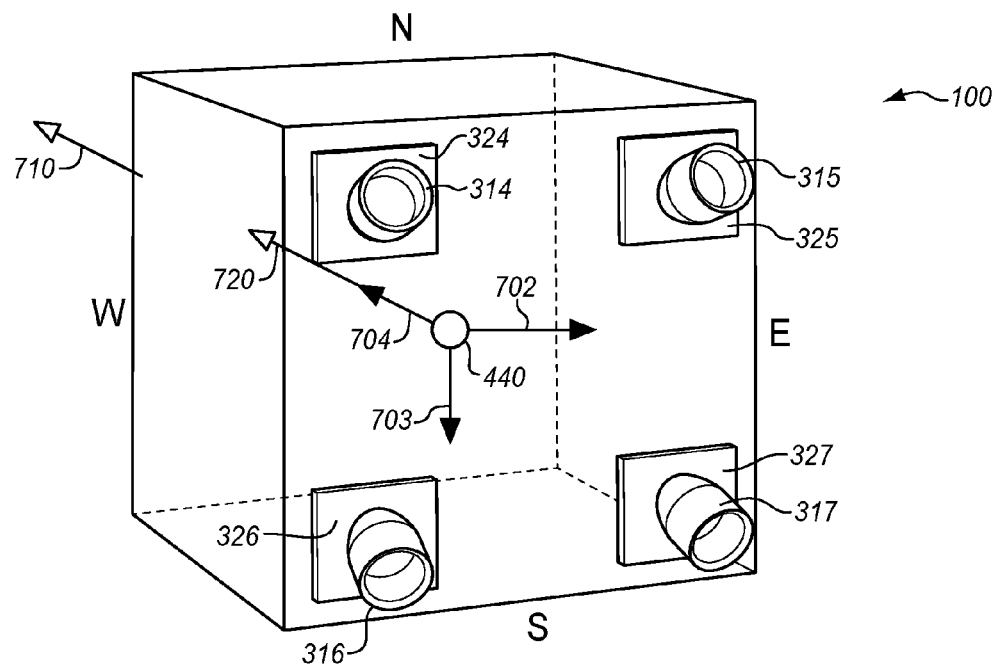
FIG. 7 illustrates a target $\Delta V$ direction for a satellite in an exemplary embodiment.

Controller 522 identifies a target spin axis for satellite 100 (step 602) in an inertial frame. FIG. 7 illustrates target spin axis 720 for satellite 100 in an exemplary embodiment. Based on mission requirements, mission control personnel may predetermine or choose a geometric body fixed axis for satellite 100 to spin about, which is referred to as the target spin axis 720. For example, one goal in the transfer orbit may be to maximize exposure of the solar panels 108-109 to the Sun. Thus, personnel may determine the target spin axis 720 for satellite 100 that maximizes exposure of solar panels 108-109 to the Sun. Another consideration for the target spin axis 720 may be the desired ΔV direction in the transfer orbit. Another consideration may be the geometry of satellite 100. Data for the target spin axis 720 may be loaded into memory and retrieved by controller 522.

For a spinning spacecraft, ideally the thrust vector is co-aligned with the spin axis of the spacecraft to maximize thrust vector efficiency. For example, controller 522 may receive data from attitude sensor 512 indicating the present attitude of satellite 100, and may orient the spacecraft such that the thrust vector in the spacecraft body frame is aligned with the desired target ΔV direction. The target ΔV direction is computed in order to achieve the proper change in orbital elements required to place the spacecraft into the final orbit.

In FIG. 6, controller 522 determines gimbal angles for one or more electric thrusters 314-317 that produce thrust forces parallel to the target spin axis 720 (step 604). Instead of the thrust forces going through the center of mass 440 of satellite 100, the thrust forces from the electric thruster(s) 314-317 are parallel to the target spin axis 720. Ideally, the thrust forces from the electric thruster(s) 314-317 are also parallel to the target ΔV direction 710. For a spinning spacecraft, the thrust vector is ideally aligned with the spin axis of the spacecraft to maximize thrust vector efficiency. For example, controller 522 may receive data from attitude sensor 512 indicating the present attitude of satellite 100, and may orient satellite 100 such that the thrust vector in the spacecraft body frame is aligned with the desired target ΔV direction. The target ΔV direction is computed in order to achieve the proper change in orbital elements required to place the spacecraft into the final orbit. FIG. 7 illustrates the target ΔV direction 710 for satellite 100. The attitude of satellite 100 may be defined with reference to a coordinate system having an x-axis 702, a y-axis 703, and a z-axis 704. The target ΔV direction 710 in this embodiment is along the z-axis 704. However, the target ΔV direction 710 may be any direction to place satellite 100 in the final orbit.

Controller 522 initiates a burn of the electric thruster(s) 314-317 at the gimbal angles (step 606 in FIG. 6) for a maneuver. Controller 522 may select a single electric thruster 314-317 for a maneuver, or may select thruster pairs. As an example, controller 522 may select vertical pairs of electric thrusters 314-317 for maneuvers, such as northwest thruster 314 and southwest thruster 316 for a maneuver, or northeast thruster 315 and southeast thruster 317 for another maneuver.

Figure 8:
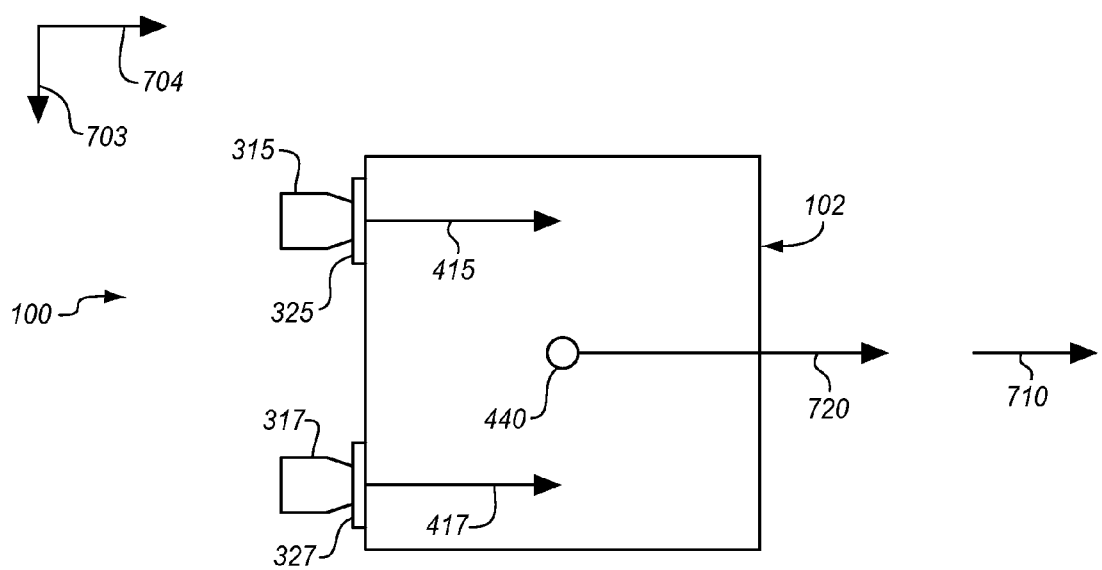
FIG. 8 is a side view of a satellite illustrating thrust forces of electric thrusters parallel to the target spin axis in an exemplary embodiment.

FIG. 8 is a side view of satellite 100 illustrating the thrust forces of electric thrusters 315 and 317 parallel to the target spin axis 720 in an exemplary embodiment. To relate FIG. 8 to FIG. 7, axis 704 is to the right, axis 703 is downward, and axis 702 is out of the page. In FIG. 8, controller 522 controls the gimbal assembly 325 for electric thruster 315 to direct the thrust force 415 of electric thruster 315 to be parallel with the target spin axis 720. Controller 522 controls the gimbal assembly 327 for electric thruster 317 to direct the thrust force 417 of electric thruster 317 to be parallel with the target spin axis 720.

Because thrust forces are not through the center of mass 440 of satellite 100 and are pointed substantially along the target ΔV direction, the cosine loss for electric thrusters 314-317 is minimized for the maneuvers. Cosine loss is the portion of thrust forces that do not contribute to ΔV due to thrust forces not pointing straight along the ΔV direction. Because cosine loss is minimized, electric thrusters 314-317 are used efficiently in the maneuvers.

Figure 9:
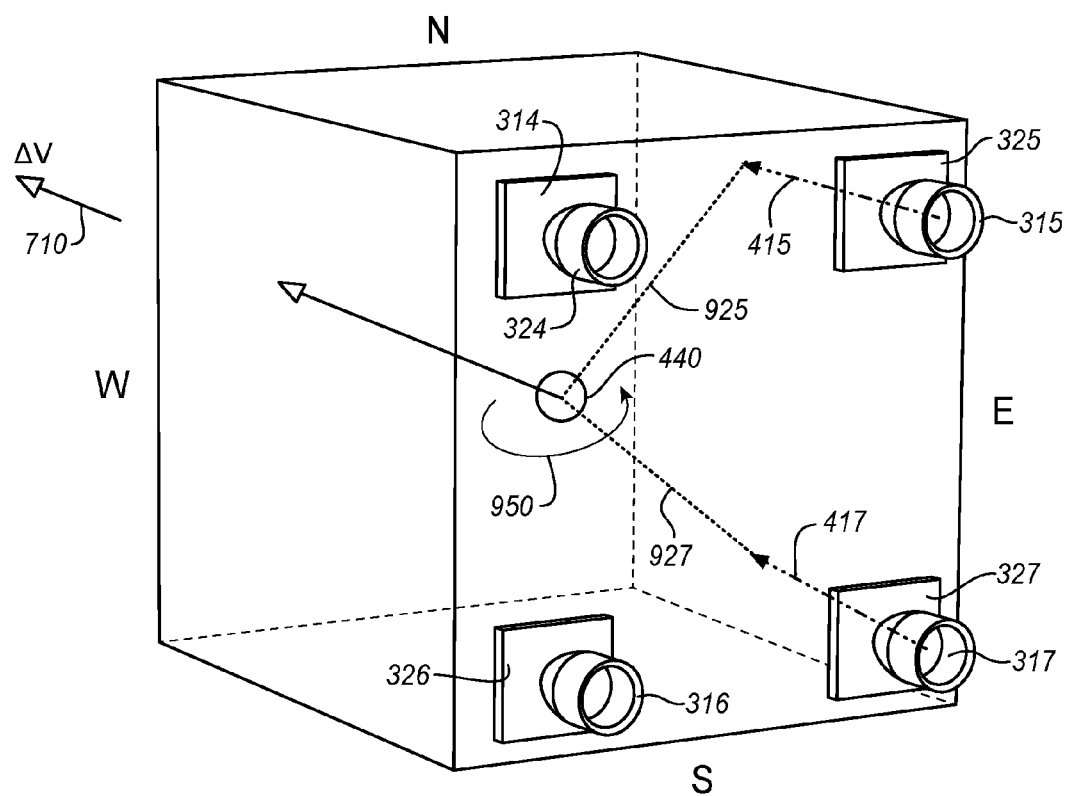
FIG. 9 illustrates moment arms from thrust forces in an exemplary embodiment.

However, when thrust forces are not through the center of mass 440 of satellite 100, the thrust forces will be spaced by a moment arm from the center of mass 440 of satellite 100 (see FIG. 4). Thrust forces that are spaced from the center of mass 400 with a moment arm will create a body fixed torque on satellite 100, which may be referred to as a thruster torque. FIG. 9 illustrates moment arms from the thrust forces in an exemplary embodiment. Thrust force 415 is spaced from the center of mass 440 by moment arm 925, and thrust force 417 is spaced from the center of mass 440 by moment arm 927. These moment arms 925 and 927 create a torque on satellite 100. When the vector of the thruster torque 950 is not aligned with the target spin axis 720, the torque can cause the actual spin axis (or rotation axis) of satellite 100 to precess, and may become misaligned with the ΔV direction. This will reduce the efficiency of the orbit raising maneuver.

Controller 522 controls momentum subsystem 502 to compensate for the thruster torque produced by the burn of the electric thruster(s) 314-317 at the gimbal angles (step 608). For example, controller 522 may include an estimator module 524 (see FIG. 5) that estimates an angular velocity of satellite 100 based on data from one or more of sensors 512-513 (step 610). Estimator module 524 may also estimate the thruster torque 950 created from the burn(s) of the electric thrusters 314-317 (step 612). Estimator module 524 may estimate the thruster torque 950 based on the thrust force and moment arm of the thrust force for each electric thruster 314-317 that is fired in a maneuver. Control law module 526 determines a target angular momentum for momentum subsystem 502 to produce based on the angular velocity of satellite 100 and the thruster torque 950 produced by the burns of thruster(s) 314-317 (step 614). Control law module 526 then generates a control command instructing momentum subsystem 502 to produce the target angular momentum (step 616). The stabilizing control law drives the angular rates on the transverse axes to zero. At steady state, the coupling between the target angular momentum produced by momentum subsystem 502 and the angular velocity of satellite 100 creates an offset torque that counteracts the thruster torque so that satellite 100 is stabilized on the target spin axis (within a tolerance).

Method 600 is performed continuously while satellite 100 is in the transfer orbit to correct the rotation axis of satellite 100 with momentum subsystem 502. Momentum subsystem 502 may also be used to assist in stabilizing the rotation of satellite 100 along the target spin axis 720. Stabilization of a spinning satellite is described in U.S. Pat. No. 6,062,512, which is incorporated by reference.

Figure 10:
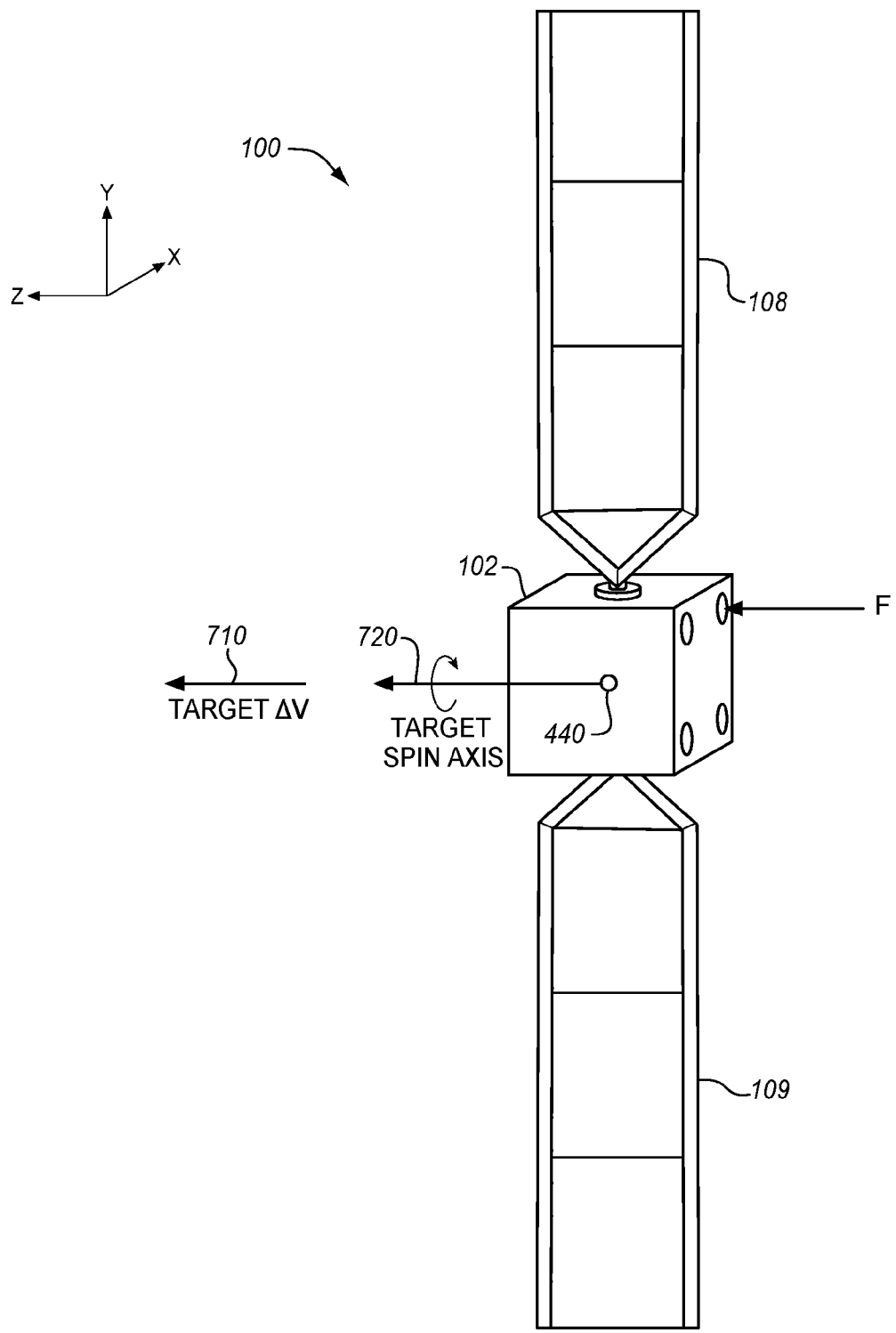
FIG. 10 illustrates a satellite spinning about a z-axis in an exemplary embodiment.

The following provides an example of spin stabilization for satellite 100. FIG. 10 illustrates satellite 100 spinning about the Z-axis in an exemplary embodiment. As shown in FIG. 10, a thrust force F may not go through the center of mass 440 of satellite 100, which produces a body fixed torque acting on satellite 100. Control system 500 is able to balance the body fixed torque and maintain the target spin axis 720 fixed in the inertial frame (see FIG. 5).

The following is a dynamic model of satellite 100:

$$I\dot{\vec{\omega}} + \dot{\vec{u}} + \vec{\omega} \times (I\vec{\omega} + \vec{h}) = \vec{T}_{thruster} \quad (1)$$

$$\dot{\vec{h}} = \vec{u} \quad (2)$$

where I is the inertia matrix of satellite 100, $\vec{\omega}$ is the angular velocity (rate) vector of satellite 100 represented in the body coordinate system, $\vec{h}$ is the momentum from the momentum subsystem 510 in the body coordinate system, $\vec{T}_{thruster}$ is the body fixed thruster torque, and $\vec{u}$ is the stabilizing control law in the form of:

$$\vec{u} = K(s)\vec{\omega} \quad (3)$$

The target spin axis 720 is the basis of the null space of K(s). At the steady state, $$\vec{\omega} \times (I\vec{\omega} \times \vec{h}) = \vec{T}_{thruster} \quad (4)$$

The steady state momentum from momentum subsystem 510 includes of two parts:

$$\vec{h} = \vec{h}_{spinbalancing} + \vec{h}'_{wheel} \quad (5)$$

The angular momentum $\vec{h}_{spinbalancing}$ balances satellite 100, making the wobble angle zero, as follows:

$$\vec{\omega} \times (I\vec{\omega} + \vec{h}_{sb}) = 0. \quad (6)$$

The angular momentum $\vec{h}'_{wheel}$ balances the body fixed thruster torque as follows:

$$\vec{\omega} \times \vec{h}'_{wheel} = \vec{T}_{thruster} \quad (7)$$

Figure 11:
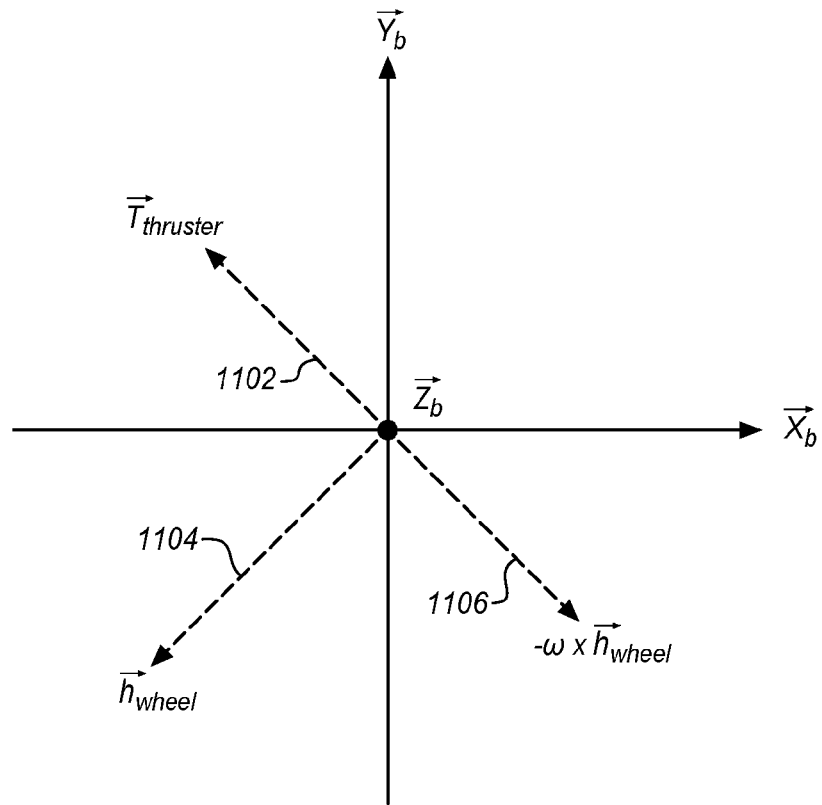
FIG. 11 illustrates cancelling of a thruster torque from burns of electric thruster(s) in an exemplary embodiment.

At steady state, $-\vec{\omega} \times \vec{h}'_{wheel}$ cancels out $\vec{T}_{thruster}$. FIG. 11 illustrates cancelling of the thruster torque $\vec{T}_{thruster}$ from burns of electric thruster(s) 314-317 in an exemplary embodiment. The vertical axis in FIG. 11 is the y-axis, and the horizontal axis is the x-axis. The z-axis is out of the page in FIG. 11. Line 1102 represents the thruster torque vector ($\vec{T}_{thruster}$). The thruster torque is the torque from electric thrusters 314-317 that have moment arms with the center of mass 440 of satellite 100 (see FIG. 4). Line 1104 represents the angular momentum of momentum subsystem 510. Line 1106 represents the offset torque ($-\vec{\omega} \times \vec{h}'_{wheel}$) from a gyroscopic coupling between the angular velocity of satellite 100 and the angular momentum produced by momentum subsystem 510.

Figure 12:
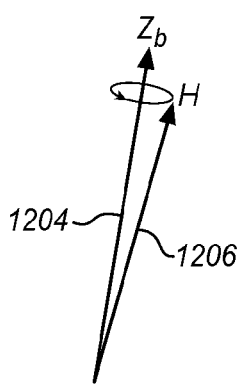
FIG. 12 illustrates the spin axis and momentum vector of a satellite in an inertial coordinate frame in an exemplary embodiment.

The spin speed of satellite 100 becomes constant, and its spin axis is fixed in the inertial frame. At the steady state, the body fixed wheel momentum $\vec{h}'_{wheel}$ rotates about the z-axis in the inertia frame. Therefore, the momentum vector H of satellite 100 forms a cone about the z-axis (target spin axis 720) with a small angle. FIG. 12 illustrates the momentum vector of satellite 100 in an exemplary embodiment. Momentum vector 1206 of satellite 100 forms a cone about the z-axis 1204.

The above system and methods provide advantages for orbit maneuvers. At steady-state, the nutation and wobble angles are near zero. The angular momentum from momentum subsystem 502 automatically balances satellite 100 about the target spin axis 720 and also balances the thruster torque in the transverse plane. There is no momentum accumulation in momentum subsystem 502 and satellite 100. At steady state, the spin axis of satellite 100 is fixed in both body frame and inertial frame. If the spin axis is aligned with target $\Delta V$ direction 710 in the inertial frame, then the thrust forces are all applied to the target $\Delta V$ direction 710. Therefore, the cosine loss of thrust forces is minimized. Minimizing cosine loss can shorten the duration of the transfer orbit, save fuel usage, and prolong the operation life of satellite 100. Because the thrust forces are parallel to the target spin axis 720, it produces near zero torque about the spin axis. Therefore, thruster firing for orbit maneuvers will not cause satellite 100 to spin up or spin down. The total momentum of satellite 100 is near constant, which minimizes the need to adjust the satellite's momentum.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A spacecraft comprising:
a bus having a nadir side and a zenith side opposite the nadir side;
a momentum subsystem configured to produce angular momentum that couples with an angular velocity of the spacecraft;
a propulsion subsystem that includes a plurality of electric thrusters installed on the zenith side of the bus to produce a change in velocity (delta-V) on the spacecraft, wherein each of the electric thrusters is coupled to the bus by a two-axis gimbal assembly; and
a controller configured to identify a target spin axis for the spacecraft in a body-fixed frame as the spacecraft is allowed to spin during a transfer orbit, to determine gimbal angles for at least one of the electric thrusters so that thrust forces from the at least one electric thruster are parallel to the target spin axis in the body-fixed frame as the spacecraft spins during the transfer orbit, and to initiate a burn of the at least one electric thruster at the gimbal angles;
the controller is configured to control the momentum subsystem to compensate for a thruster torque in the body-fixed frame produced by the burn of the at least one electric thruster at the gimbal angles as the spacecraft spins during the transfer orbit to stabilize the spacecraft on the target spin axis within a tolerance.

2. The spacecraft of claim 1 wherein:
the momentum subsystem is configured to produce a target angular momentum, wherein a coupling between the target angular momentum and the angular velocity of the spacecraft creates an offset torque to counteract the thruster torque created from the burn of the at least one electric thruster.

3. The spacecraft of claim 2 wherein:
the controller is configured to estimate the angular velocity of the spacecraft, to estimate the thruster torque created from the burn of the at least one electric thruster, to determine the target angular momentum based on the angular velocity and the thruster torque, and to generate a command to instruct the momentum subsystem to produce the target angular momentum.

4. The spacecraft of claim 1 wherein:
the target spin axis is aligned with a target delta-V direction.

5. The spacecraft of claim 1 wherein:
the momentum subsystem comprises a reaction wheel subsystem having a plurality of reaction wheels.

6. The spacecraft of claim 1 wherein:
the momentum subsystem comprises a control momentum gyroscope (CMG).

7. The spacecraft of claim 1 further comprising:
a sensor subsystem that includes an attitude sensor configured to provide measurement data of an attitude of the spacecraft.

8. The spacecraft of claim 1 further comprising:
a sensor subsystem that includes a rate sensor configured to provide measurement data of the angular velocity of the spacecraft.

9. The spacecraft of claim 1 wherein:
the plurality of electric thrusters includes a northwest thruster, a northeast thruster, a southwest thruster, and a southeast thruster installed on the zenith side of the bus.

10. The spacecraft of claim 1 wherein:
the electric thrusters use xenon as a propellant.

11. A method for controlling a spacecraft in a transfer orbit, wherein the spacecraft comprises a bus having a nadir side and a zenith side opposite the nadir side, a momentum subsystem configured to produce angular momentum that couples with an angular velocity of the spacecraft, and a propulsion subsystem that includes a plurality of electric thrusters installed on the zenith side of the bus by a two-axis gimbal assembly, the method comprising:
identifying a target spin axis for the spacecraft in a body-fixed frame as the spacecraft is allowed to spin during the transfer orbit;
determining gimbal angles for at least one of the electric thrusters that so that thrust forces from the at least one electric thruster are parallel to the target spin axis in the body-fixed frame as the spacecraft spins during the transfer orbit;
initiating a burn of the at least one electric thruster at the gimbal angles; and
controlling the momentum subsystem to compensate for a thruster torque in the body-fixed frame produced by the burn of the at least one electric thruster at the gimbal angles as the spacecraft spins during the transfer orbit to stabilize the spacecraft on the target spin axis within a tolerance.

12. The method of claim 11 wherein controlling the momentum subsystem to compensate for a thruster torque produced by the burn of the at least one electric thruster at the gimbal angles comprises:
producing a target angular momentum with the momentum subsystem, wherein a coupling between the target angular momentum and the angular velocity of the spacecraft creates an offset torque to counteract the thruster torque created from the burn of the at least one electric thruster.

13. The method of claim 12 wherein controlling the momentum subsystem to compensate for a thruster torque produced by the burn of the at least one electric thruster at the gimbal angles comprises:
estimating the angular velocity of the spacecraft;
estimating the thruster torque created from the burn of the at least one electric thruster;
determining the target angular momentum based on the angular velocity and the thruster torque; and
generating a command to instruct the momentum subsystem to produce the target angular momentum.

14. The method of claim 11 wherein:
the target spin axis is aligned with a target delta-V direction.

15. An apparatus comprising:
a controller configured to control a spacecraft in a transfer orbit, wherein the spacecraft comprises:
a bus having a nadir side and a zenith side opposite the nadir side;
a momentum subsystem that produce angular momentum that couples with an angular velocity of the spacecraft; and
a propulsion subsystem that includes a plurality of electric thrusters installed on the zenith side of the bus, wherein each of the electric thrusters is coupled to the bus by a two-axis gimbal assembly;
the controller is configured to identify a target spin axis for the spacecraft in a body-fixed frame as the spacecraft is allowed to spin during the transfer orbit, to determine gimbal angles for at least one of the electric thrusters so that thrust forces from the at least one electric thruster are parallel to the target spin axis in the body-fixed frame as the spacecraft spins during the transfer orbit, to initiate a burn of the at least one electric thruster at the gimbal angles, and to control the momentum subsystem to compensate for a thruster torque in the body-fixed frame produced by the burn of the at least one electric thruster at the gimbal angles as the spacecraft spins during the transfer orbit to stabilize the spacecraft on the target spin axis within a tolerance.

16. The apparatus of claim 15 wherein:
the controller is configured to control the momentum subsystem to produce a target angular momentum, wherein a coupling between the target angular momentum and the angular velocity of the spacecraft creates an offset torque to counteract the thruster torque created from the burn of the at least one electric thruster.

17. The apparatus of claim 16 wherein:
the controller includes:
an estimator module configured to estimate the angular velocity of the spacecraft, and to estimate the thruster torque created from the burn of the at least one electric thruster; and
a control law module configured to determine the target angular momentum based on the angular velocity and the thruster torque, and to generate a command to instruct the momentum subsystem to produce the target angular momentum.

18. The apparatus of claim 15 wherein:
the target spin axis is aligned with a target delta-V direction.

19. The apparatus of claim 15 wherein:
the controller is coupled to an attitude sensor configured to provide measurement data of an attitude of the spacecraft.

20. The apparatus of claim 15 wherein:
the controller is coupled to a rate sensor configured to provide measurement data of the angular velocity of the spacecraft.

\* \* \* \* \*